Nov. 28, 1939.  H. A. KNOX  2,181,136
METHOD OF ASSEMBLING THE ELEMENTS OF A JOINT
Filed Sept. 20, 1937
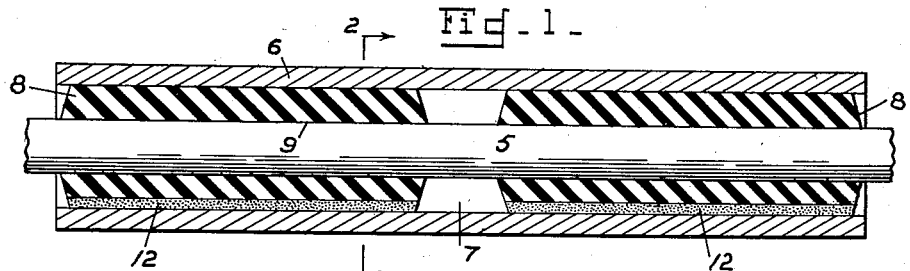
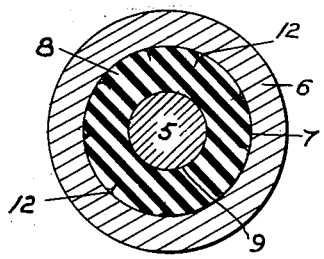
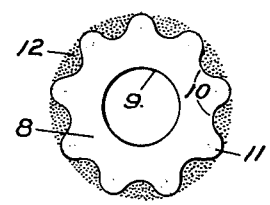
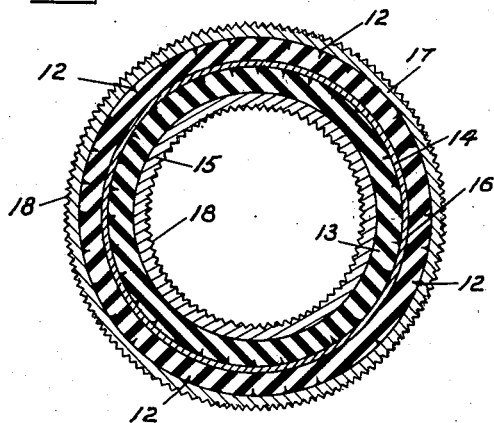
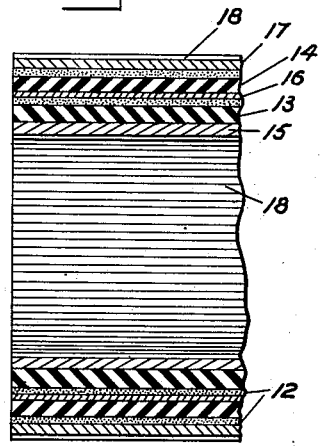
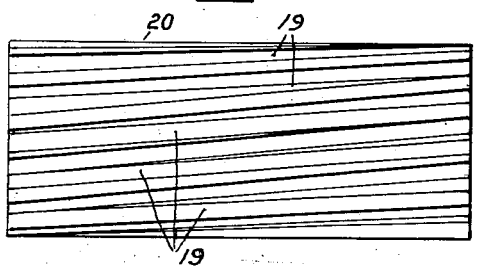
Inventor
Harry A. Knox
By W. N. Roach.
Attorney Patented Nov. 28, 1939

2,181,136

UNITED STATES PATENT OFFICE 2,181,136

METHOD OF ASSEMBLING THE ELEMENTS OF A JOINT

Harry A. Knox, Washington, D. C.

Application September 20, 1937, Serial No. 164,746

1 Claim. (Cl. 29—88.2)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a joint and a method of assembling the elements of the joint.

Frictionless joints are formed by interposing between spaced joint members an intermediate elastic member of rubber or rubber-like material which is secured to the joint members and functions through its distortion to permit relative movement of the joint members. The general method of securing the rubber to both joint members by vulcanization complicates final assembly and replacement.

The purpose of this invention is to provide a structure which will facilitate final assembly of the joint and which will allow for compression of the rubber while at the same time carrying a fluid or plastic adhesive which serves when dry to firmly secure the rubber in place.

To these and other ends the invention consists in the construction, arrangement and combination of elements described hereinafter and pointed out in the claim forming a part of this specification.

A practical embodiment of the invention is illustrated in the accompanying drawing, wherein:

Fig. 1 is a longitudinal sectional view of an assembled joint constructed in accordance with the invention;

Fig. 2 is a sectional view on the line 2—2 of Fig. 1;

Fig. 3 is an end view of the elastic member prior to assembly;

Fig. 4 is a transverse sectional view of an assembled joint including a plurality of elastic members;

Fig. 5 is a longitudinal sectional view thereof;

Fig. 6 is a view in elevation showing a different arrangement of the grooves.

Referring to Figs. 1 to 3 there is shown a joint of the type employed in a track for a track-laying vehicle. This joint comprises an inner cylindrical rod 5, an outer member 6 having a cylindrical bore 7 spaced from the rod, and a tubular elastic member 8 interposed between the inner and outer members.

The elastic member 8 has a cylindrical inner wall 9 of substantially the same diameter as the rod 5 and when mounted on the rod it is secured thereto by vulcanization. The outer wall of the member 8 is of cylindrical outline but is formed with surface depressions, specifically, longitudinally extending grooves 10 providing spaced ribs 11. The circumference of the member 8 is greater than that of the bore 7 so that when the member 8 is inserted in the bore, the elastic material of the member 8 is compressed with the result that the ribs 11 are displaced laterally and close the grooves 10.

Prior to insertion of the elastic member 8 into the bore 7, it is covered with a fluid or plastic cement 12 which fills the grooves. The cement is thereby carried into the member 6 and when the grooves are closed by displacement of the ribs the cement is distributed over the wall of the bore 7. The cement serves as a lubricant to facilitate assembly and when it becomes dry it adhesively unites the elastic member to the outer member 6.

In the joint shown in Figs. 4 and 5 a plurality of concentrically arranged elastic members 13 and 14 are interposed between spaced concentric tubes 15, 16 and 17. The inner surface of the inner tube 15 and the outer surface of the outer tube 17 are provided with means, for example serrations 18, whereby they are fastened to joint members corresponding to the members 5 and 6 of Fig. 1.

In the modification shown in Fig. 6 the grooves 19 are arranged obliquely to the axis of the elastic member 20.

I claim:

The method of forming an oscillating joint consisting of inner and outer rigid members interconnected by an elastic member which comprises providing an elastic member of a diameter in excess of the internal diameter of the outer rigid member with alternate longitudinal ribs and grooves of substantial radial dimensions, bonding the elastic member to the inner rigid member, filling the grooves of the elastic member with an adhesive, and then forcing the elastic member and the inner rigid member into the outer rigid member to displace the elastic member; the displacement, due to the excess diameter, being sufficient to obliterate the grooves and produce a complete surface bonding.

HARRY A. KNOX.